Sept. 11, 1928.
E. W. KNOWLTON
1,683,679
MEAT AND FOOD GRINDER
Filed May 7, 1925
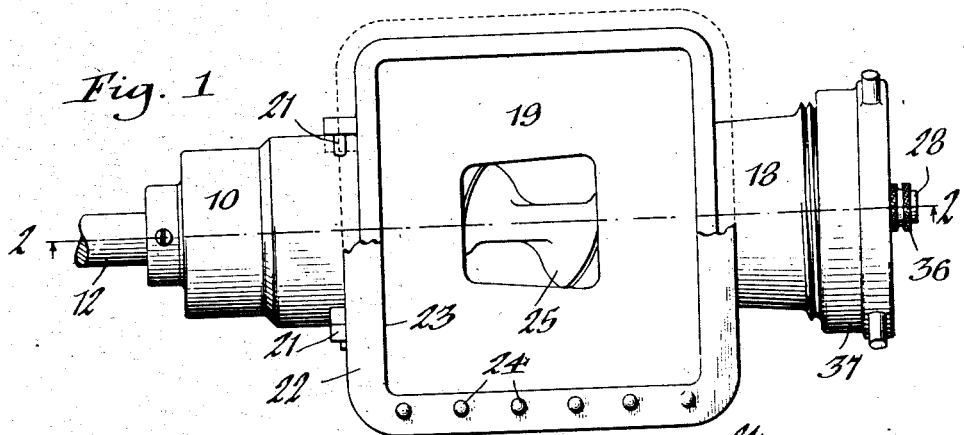
Fig. 1
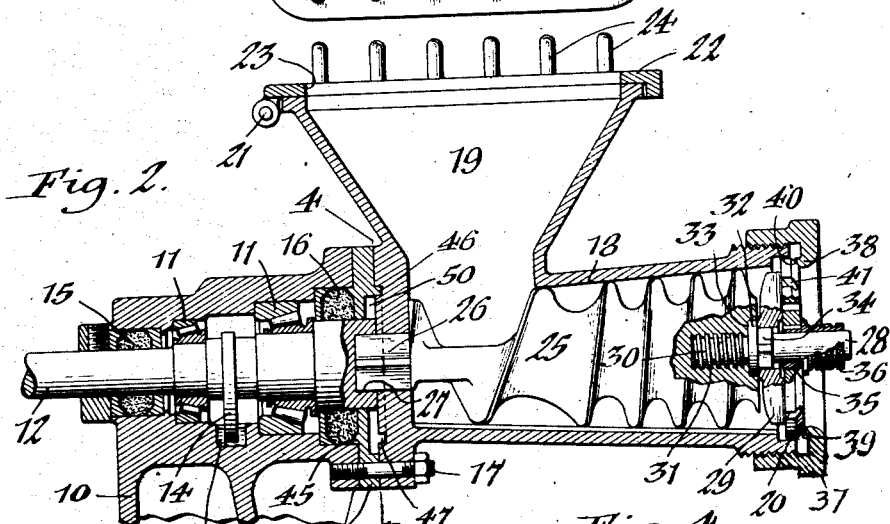
Fig. 2
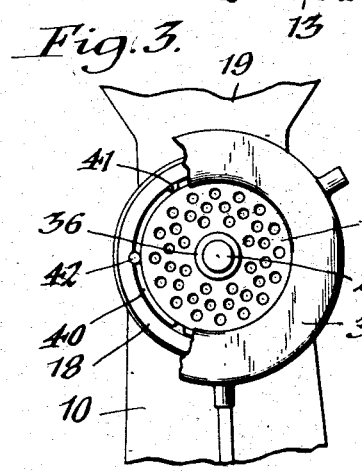
Fig. 3
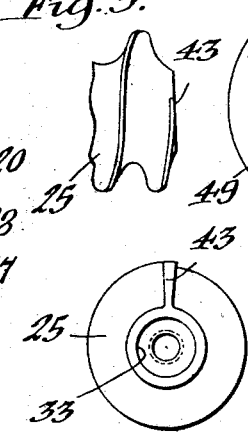
Fig. 5
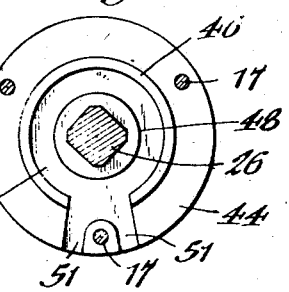
Fig. 4
Fig. 6.
Inventor,
Eugene W. Knowlton,
by Geyer & Geyer
Attorneys Patented Sept. 11, 1928.

1,683,679

UNITED STATES PATENT OFFICE.

EUGENE W. KNOWLTON, OF BUFFALO, NEW YORK, ASSIGNOR TO JOHN E. SMITH'S SONS CO., OF BUFFALO, NEW YORK, A CORPORATION OF NEW YORK.

MEAT AND FOOD GRINDER.

Application filed May 7, 1925. Serial No. 28,603.

This invention relates to improvements in meat and food grinders of the screw type.

One of its objects is to provide an efficient and sanitary grinder of this character in which the screw is so mounted that the same is self-centering and prevented from sagging and rubbing on the bottom of the grinder-casing.

Another object of the invention is to provide the grinder with means for intercepting the flow of oil from the bearings into the grinder-casing and for preventing the escape of the meat-juices from the latter into the bearings.

A further object is to provide the grinder with means for readily removing the meat or other food from the loading fork into the hopper without the hands touching it.

Still further objects of the invention have to do with the construction and arrangement of its parts, as will be hereinafter more fully described and particularly pointed out in the appended claims.

In the accompanying drawings:

Figure 1 is a fragmentary top plan view of a meat grinder embodying my improvements. Figure 2 is a vertical longitudinal section thereof on line 2—2, Fig. 1. Figure 3 is a fragmentary end view of the grinder. Figure 4 is a transverse section on line 4—4, Fig. 2. Figure 5 is a fragmentary plan view of the feed screw. Figure 6 is a front end view thereof.

Similar characters of reference indicate corresponding parts throughout the several views.

As is customary, the meat grinder is mounted on the upper end of a suitable frame or standard 10, which, in the example shown in the drawings, is provided with one or more roller thrust bearings 11 for the driving shaft 12, the latter being driven by an electric motor or other source of power, not shown. Interposed between the two thrust bearings is an oil well 13 into which a ring 14, carried by the driving shaft, is adapted to extend for constantly keeping the bearings lubricated. A suitable packing 15 inserted in the rear end of the standard around the shaft 12 prevents leakage of oil past the same, and a similar packing 16 is arranged in the opposite end thereof.

Secured to the front end of the standard 10 by bolts 17 is the grinder-casing 18 having a hopper 19 extending from its upper side and the customary perforated disk or plate 20 in its front end through which the meat is discharged. The inlet or feed end of this hopper is preferably square-shaped in plan and hinged at 21 to the rear wall thereof is a square frame 22 which normally rests on the flanged upper end of the hopper, as shown in Fig. 2 and which has an opening 23 therein. Upon one or more sides of this hinged frame are arranged a plurality of upright pins or prongs 24 which serve to facilitate the removal of the meat or other food from the loading fork into the hopper without the hands touching the same, thereby rendering the loading operation of the grinder strictly sanitary.

The numeral 25 indicates the feed screw which is arranged lengthwise in the grinder-casing 18 in axial alinement with the driving shaft 12 and separably connected thereto to turn therewith. For this purpose, the screw has a square rear end 26 which engages a correspondingly-shaped socket 27 formed in the opposing end of said driving shaft. Projecting axially from the front end of the feed screw and extending through the perforated plate 20 is a stud or spindle 28 which serves as a journal for said screw and also as a support for the knife 29. As shown in Fig. 2, this spindle is preferably provided at its inner end with an acme or square thread 30 which engages a correspondingly-threaded opening 31 in the end of the screw, and intermediate its ends said spindle has an annular flange 32 which is seated in a counter-bore 33 formed in the screw. In front of its flange, the spindle has a square portion 34 upon which the knife 29 is mounted to turn with the feed screw, said knife being confined squarely between the spindle-flange and the perforated plate. A bushing 35 for the front end of the spindle is fitted into the plate 20, this bushing having a knurled hand grip 36 and being preferably made of a non-ferrous metal which guards against corrosion or poisonous discoloration.

Applied to the externally-threaded front end of the grinder-casing 18 is a retaining ring 37 which not only holds the feed screw against forward endwise displacement, but also acts to automatically center the same in said casing. To this end, this ring has an in-turned annular flange 38 terminating in a beveled or chamfered inner face 39 which abuts against a correspondingly beveled face 40 formed on the perforated plate 20, the latter extending somewhat beyond the end of the grinder casing for this purpose, as shown in Fig. 2. Thus, when the retaining ring is screwed into place, the feed screw is properly centered and maintained in such position, thereby preventing sagging of the screw and its becoming disalined from the driving shaft 12. In its periphery, the perforated plate has a plurality of equi-distant radial notches 41 which engage one or more pins 42 projecting forwardly from the grinder-casing. This allows the plate to be applied in a number of different positions, permitting its bearing face to be distributed along its entire circumference and prolonging the life of the plate accordingly.

The foremost turn or thread of the feed screw terminates in a flat upright portion 43 which is arranged at right angles to the axis of the screw, as shown in Figs. 5 and 6. This construction has a tendency to force the meat or food tightly against the cutting surface of the plate 20 and resists its backward movement over the screw. It will be noted that said flat portion 43 is comparatively narrow to prevent the screw from pasting the substance against the plate and to eliminate the mashing of the same into juice.

Interposed between the rear end of the grinder-casing 18 and its supporting standard 10 is a spacer plate or ring 44 which is held in place by bolts 17. This plate fits over the socketed front end of the driving shaft 12 and has an annular flange 45 on its rear side forming a stuffing box gland for the packing 16, and an annular lip or tongue 46 on its front side which engages a corresponding groove 47 in the opposing end of the casing, as shown in Fig. 2. Immediately surrounding its opening 48, the spacer plate is provided with a recess or depression 49 which forms a pocket or reservoir 50, between the contiguous faces of the casing and said plate, for intercepting the passage of the meat juices into the bearings and likewise the seeping of oil into the casing. Extending downwardly from the plate-recess 49 are drain passages 51 which permit the contents of the pocket 50 to discharge therethrough on to the floor or into a suitable receptacle provided for this purpose. By this provision, any tendency of the meat juices to leak into the bearings is effectually prevented and danger of the oil gaining access to the grinder-casing and contaminating the meat therein is likewise avoided. The pocket-plate 10, being separate from the standard and the grinder casing, can be readily removed to clean it and keep it sanitary.

While manifestly simple, compact and durable in construction, this improved grinder is efficient in operation and its novel features of construction aim toward perfect sanitation. Furthermore, the machine can be readily dismembered for cleaning by simply removing the retaining ring 37, grasping the hand grip 36 of the bushing 35 and then unscrewing the spindle 28 from the feed screw, the perforated plate and knife 29 being removed as a unit with the spindle.

I claim as my invention:

1. A meat grinding machine, comprising a grinder-casing including a hopper, and prongs applied to the top of said hopper for facilitating the removal of the meat from the loading fork.

2. A meat grinding machine, comprising a grinder-casing including a hopper, an open frame hinged to the top of said hopper, and prongs rising from said frame for facilitating the removal of the meat from the loading fork.

3. A meat grinding machine, comprising a grinder-casing, a perforated plate in the front end of said casing, a feed-screw operating in the casing and supported at its front end on said plate, and a member applied to said casing and engaging said plate for centering the screw in its casing.

4. A meat grinding machine, comprising a grinder-casing, a perforated plate in the front end of said casing, a feed-screw operating in the casing and supported at its front end on said plate, and a rotatable member adjustably mounted on the front end of said casing and having a supporting flange for receiving and sustaining said plate.

5. A meat grinding machine, comprising a grinder-casing, a perforated plate in the front end of said casing having a beveled front edge, a feed-screw operating in the casing and supported at its rear end in the latter and at its front end on said plate, and a retaining ring applied to the front end of said casing and having an inturned, annular flange, said flange having its rear edge beveled for receiving the beveled edge of said plate.

6. A meat grinding machine, comprising a grinder-casing, a perforated plate in the front end of said casing, a feed-screw operating in the casing and having a threaded opening in its front end, a spindle having a threaded rear portion engaging said screw-opening and having its front portion extended through a central opening of said plate, a knife mounted on said spindle on the inner side of said plate, and a spindle bushing separate from said plate fixed in its opening and having a hand grip for turning the spindle to remove the plate and the knife as a unit.

7. A meat grinding machine, comprising a supporting frame, a grinder-casing attached to the frame and containing a screw, a bearing in the frame adjacent to the rear end of the grinder-casing, a driving shaft for the screw journaled in said bearing, and a removable spacer-plate interposed between the rear end of the grinder-casing and said shaft-bearing and having a pocket for intercepting and receiving meat juices and bearing lubricant, said pocket having a drain passage.

EUGENE W. KNOWLTON.